United States Patent [19]

Cummings et al.

[11] Patent Number: 5,661,251

[45] Date of Patent: Aug. 26, 1997

[54] SENSOR APPARATUS FOR PROCESS MEASUREMENT

[75] Inventors: Donald D. Cummings; Gerd Wartmann, both of Greenwood; Kenneth L. Perdue, Franklin, all of Ind.

[73] Assignee: Endress + Hauser GmbH + Co., Maulburg, Germany

[21] Appl. No.: 574,818

[22] Filed: Dec. 19, 1995

[51] Int. Cl.$^6$ .......................... G01D 5/12; G01M 19/00; G01F 23/24

[52] U.S. Cl. ........................ 73/866.5; 73/304 R

[58] Field of Search .............. 73/866.5, 304 R, 73/304 C

[56] References Cited

U.S. PATENT DOCUMENTS

| | | | |
|---|---|---|---|
| 3,832,900 | 9/1974 | Ross | 73/290 R |
| 3,922,914 | 12/1975 | Fuchs | 73/290 R |
| 3,995,212 | 11/1976 | Ross | 73/304 R X |
| 4,010,537 | 3/1977 | Oxenreider | 73/304 R X |
| 4,135,397 | 1/1979 | Krake | 73/290 R |
| 4,301,681 | 11/1981 | Moltby et al. | 73/304 C |
| 4,322,832 | 3/1982 | Sartorius | 368/47 |
| 4,465,088 | 8/1984 | Vosper | 73/304 R X |
| 5,122,740 | 6/1992 | Cotton et al. | 73/661 X |
| 5,323,361 | 6/1994 | Elle et al. | 367/98 |
| 5,339,861 | 8/1994 | Smith, III | 137/614.04 |
| 5,345,471 | 9/1994 | McEwan | 375/1 |
| 5,361,070 | 11/1994 | McEwan | 342/21 |
| 5,376,888 | 12/1994 | Hook | 324/643 |
| 5,391,839 | 2/1995 | Lang et al. | 174/65 R |
| 5,420,517 | 5/1995 | Skaling et al. | 324/643 |

FOREIGN PATENT DOCUMENTS

| | | |
|---|---|---|
| 0 260 113 | 3/1988 | European Pat. Off. . |
| 27 44 862 | 4/1979 | Germany . |
| 33 37 690 | 4/1985 | Germany . |
| 42 04 414 | 6/1993 | Germany . |
| 43 08 373 | 9/1994 | Germany . |
| 2 064 128 | 6/1981 | United Kingdom . |
| 1 599 695 | 10/1981 | United Kingdom . |
| 2 079 950 | 1/1982 | United Kingdom . |

OTHER PUBLICATIONS

Steven Arcone, "Conductivity limitations in single-reflection time-domain reflectometry", J. Phys. E. Sci. Instrum. 19 (1986), pp. 1067–1069.

*Primary Examiner*—Thomas P. Noland
*Attorney, Agent, or Firm*—Bose McKinney & Evans

[57] ABSTRACT

A sensor apparatus is provided for transmitting electrical pulses from a signal line into a vessel to measure a process parameter. The sensor apparatus includes a lower flange configured to be coupled to the vessel. The lower flange is formed to include a central aperture defined by a radially outwardly tapered surface located adjacent a top surface of the lower flange. The apparatus also includes a conductive probe element including a head having first and second radially outwardly tapered surfaces and an elongated conductive portion extending away from the head. The first tapered surface of the head is configured to engage the tapered surface of the lower flange to prevent movement of the probe element in a direction toward the lower flange. The apparatus further includes an upper flange configured to be coupled to the lower flange to secure the probe element to the lower flange. The upper flange includes a central aperture defined by a radially outwardly tapered surface located adjacent a bottom surface of the upper flange. The tapered surface of the upper flange is configured to engage the second tapered surface of the probe element to prevent movement of the probe element in a direction toward the upper flange. The apparatus still further includes a launch plate coupled to the upper flange, and an electrical connector coupled to the probe element. The connector is configured to couple the signal line to the probe element.

31 Claims, 8 Drawing Sheets

SENSOR APPARATUS FOR PROCESS MEASUREMENT

BACKGROUND AND SUMMARY OF THE INVENTION

The present invention relates to a sensor apparatus for transmitting electrical pulses from a signal line into and out of a vessel to measure a process variable.

The process and storage industries have long used various types of equipment to measure process parameters such as level, flow temperature, etc. A number of different techniques (such as mechanical, capacitance, ultrasonic, hydrostatic, etc.) provide measurement solutions for many applications. However, many other applications remain for which no available technology can provide a solution, or which cannot provide such a solution at a reasonable cost. For many applications that could benefit from a level measurement system, currently available level measurement systems are too expensive.

In certain applications, such as high volume petroleum storage, the value of the measured materials is high enough to justify high cost level measurement systems which are required for the extreme accuracy needed. Such expensive measurement systems can include a servo tank gauging system or a frequency modulated continuous wave radar system.

There are many applications that exist where the need to measure level of the product is high in order to maintain product quality, conserve resources, improve safety, etc. However, lower cost measurement systems are needed in order to allow a plant to instrument its measurements fully.

Further, there are certain process measurement applications that demand other than conventional measurement approaches. For example, applications demanding high temperature and high pressure capabilities during level measurements must typically rely on capacitance measurement. However, conventional capacitance measurement systems are vulnerable to errors induced by changing material characteristics. Further, the inherent nature of capacitance measurement techniques prevents the use of such capacitance level measurement techniques in vessels containing more than one fluid layer.

Ultrasonic time-of-flight technology has reduced concerns regarding level indications changing as material characteristics change. However, ultrasonic level measurement sensors cannot work under high temperatures, high pressures, or in vacuums. In addition, such ultrasonic sensors have a low tolerance for acoustic noise.

One technological approach to solving these problems is the use of guided wave pulses. These pulses are transmitted down a dual probe transmission line into the stored material, and are reflected from probe impedance changes which correlate with the fluid level. Process electronics then convert the time-of-flight signals into a meaningful fluid level reading. Conventional guided wave pulse techniques are very expensive due to the nature of equipment needed to produce high-quality, short pulses and to measure the time-of-flight for such short time events. Further, such probes are not a simple construction and are expensive to produce compared to simple capacitance level probes.

Recent developments by the National Laboratory System now make it possible to generate fast, low power pulses, and to time their return with very inexpensive circuits. See, for example, U.S. Pat. Nos. 5,345,471 and 5,361,070. However, this new technology alone will not permit proliferation of level measurement technology into process and storage measurement applications. The pulses generated by this new technology are broadband, and also are not square wave pulses. In addition, the generated pulses have a very low power level. Such pulses are at a frequency of 100 MHz or higher, and have an average power level of about 1 nanoWatt or lower. These factors present new problems that must be overcome to transmit the pulses down a probe and back and to process and interpret the returned pulses.

The present invention relates to a sensor apparatus for transmitting these low power, high frequency pulses down a probe and effecting their return. Currently, no industrially suitable sensor exists which can economically function as a transmission line and withstand typical industrial process and storage environments, while maintaining vessel integrity.

The present invention relates to a single conductor surface wave transmission line (Goubau line) adapted as a sensor for industrial process variable measurement. The present invention incorporates not only the transmission line function, but also a reference pulse means, a sensing function, a process connection mounting function, a sensor fixing means, and a process sealing means all in a single construction which is compatible with standard industrial mounting requirements such as flanges or threaded connections. The apparatus of the present invention also meets the heavy duty demands of an industrial environment and is suitable for installation in areas of high temperature, high humidity, high pressure, high chemical aggressiveness, high static electricity, and high electromagnetic influence. The sensor apparatus is connected electrically to a process measurement system electronics which provides its power and signal processing. The sensor apparatus is specifically designed to handle high speed, low power, high frequency broadband pulses which are delivered by the system electronics.

The sensor apparatus of the present invention is particularly adapted for the measurement of material levels in process vessels and storage vessels, but is not thereto limited. It is understood that the sensor apparatus may be used for measurement of other process variables such as flow, composition, dielectric constant, moisture content, etc. In the specification and claims, the term "vessel" refers to pipes, chutes, bins, tanks, reservoirs, or any other storage vessels. Such storage vessels may also include fuel tanks, and a host of automotive or vehicular fluid storage systems or reservoirs for engine oil, hydraulic fluids, brake fluids, wiper fluids, coolant, power steering fluid, transmission fluid, and fuel.

The present invention propagates electromagnetic energy down an inexpensive, single conductor transmission line as an alternative to conventional coax cable transmission lines. The Goubau line lends itself to applications for a level measurement sensor where an economical rod or cable probe (i.e., a one conductor instead of a twin or dual conductor approach) is desired. The single conductor approach enables not only taking advantage of new pulse generation and detection technologies, but also constructing probes in a manner similar to economical capacitance level probes.

As discussed above, the simplest implementations of a single transmission line in a process measurement probe will not withstand the previously discussed rigors of an industrial environment. Further, standard capacitance level probes do not accommodate the transmission of high speed pulses due to the electrical impedance discontinuities which exist in their assembly.

The present invention solves problems associated with implementing the new, inexpensive pulse technology by providing an improved mounting, fixing, securing, and sealing sensor apparatus including the combination probe element and transmission line. The present invention accomplishes these features while maintaining the electrical operation of a Goubau line including pulse launch, smooth impedance transition from cabling, reference pulse control, and transmission through the mounting including both transmitted pulse control and reflected pulse control.

According to one aspect of the invention, a sensor apparatus is provided for transmitting electrical pulses from a signal line into a vessel to measure a process parameter. The sensor apparatus includes a lower flange configured to be coupled to the vessel. The lower flange is formed to include a central aperture defined by a radially outwardly tapered surface located adjacent a top surface of the lower flange. The apparatus also includes a conductive probe element including a head having first and second radially outwardly tapered surfaces and an elongated conductive portion extending away from the head. The first tapered surface of the head is configured to engage the tapered surface of the lower flange to prevent movement of the probe element in a direction toward the lower flange. The apparatus further includes an upper flange configured to be coupled to the lower flange to secure the probe element to the lower flange. The upper flange includes a central aperture defined by a radially outwardly tapered surface located adjacent a bottom surface of the upper flange. The tapered surface of the upper flange is configured to engage the second tapered surface of the probe element to prevent movement of the probe element in a direction toward the upper flange. The apparatus still further includes a launch plate coupled to the upper flange, and an electrical connector coupled to the probe element. The connector is configured to couple the signal line to the probe element.

In the illustrated embodiment, the probe element is covered with an insulative material. The insulative material may have an increased thickness adjacent to the head of the probe element to improve sealing between the probe element and the upper and lower flanges. Illustratively, the probe element, the upper and lower flanges, and the launch plate are made from stainless steel.

In one illustrated embodiment, the tapered surface of the lower flange converges in a direction extending downwardly from the top surface of the lower flange, and the tapered surface of the upper flange converges in a direction extending upwardly from the bottom surface of the upper flange. The second tapered surface of the probe element is a divergent conical surface in a direction extending downwardly from a top end of the probe element, and the first tapered surface of the probe element is a convergent conical surface in a direction extending downwardly from the second tapered surface.

In another illustrated embodiment, the central aperture of the lower flange is formed to include a radially expanded cavity adjacent said top surface. The tapered surface of the lower flange is formed by a separate insert positioned within the cavity of the lower flange. The central aperture of the upper flange is formed to include a radially expanded cavity adjacent said bottom surface. The tapered surface of the upper flange is formed by a separate insert positioned within the cavity of the upper flange. The inserts are illustratively formed from a nonconductive material.

Also in the illustrated embodiment, the signal line includes signal conductor and a ground conductor. The electrical connector is configured to couple the signal conductor to the probe element and to couple the ground conductor to the launch plate. The launch plate and the upper flange are configured to generate a reflective reference pulse on the signal line as the electrical pulses move from the signal line to the probe element. In one illustrated embodiment, the apparatus further includes a static discharge resistor or complex impedance network coupled between the probe element and the launch plate.

According to another aspect of the present invention, a sensor apparatus is provided for transmitting electrical pulses from a signal line into a vessel to measure a process parameter. The sensor apparatus includes a lower flange configured to be coupled to the vessel. The lower flange is formed to include a central aperture extending between a top surface and a bottom surface of the lower flange. The apparatus also includes a conductive probe element extending through the central aperture of the lower flange, and an upper flange configured to be coupled to the lower flange to secure the probe element to the lower flange. The upper flange includes a central aperture extending between a top surface and a bottom surface of the upper flange for receiving a top end of the probe element. The apparatus further includes a first seal for sealing the probe and the lower flange, and a second seal for sealing the probe and the upper flange. The top surface of the lower flange is spaced apart from the bottom surface of the upper flange to permit any material passing through the first seal to escape therebetween. The apparatus still further includes a launch plate coupled to the upper flange, and an electrical connector coupled to the probe element. The connector is configured to couple the signal line to the probe element.

In one illustrated embodiment, the first seal is formed by a radially outwardly tapered surface located adjacent a top surface of the lower flange which engages a first radially outwardly tapered surface formed on the probe element. The second seal is formed by a radially outwardly tapered surface located adjacent a bottom surface of the upper flange which engages a second tapered surface of the probe element.

In another illustrated embodiment, the central aperture of the lower flange is formed to include a radially expanded cavity adjacent said top surface, and the tapered surface of the lower flange is formed by a separate lower insert positioned within the cavity of the lower flange. The central aperture of the upper flange is formed to include a radially expanded cavity adjacent said bottom surface, and the tapered surface of the upper flange is formed by a separate upper insert positioned within the cavity of the upper flange. The upper and lower flanges are illustratively made from a conductive material, and the upper and lower inserts are made from a nonconductive material.

According to yet another embodiment of the present invention, a sensor apparatus is provided for transmitting electrical pulses from a signal line into a vessel to measure a process parameter. The sensor apparatus includes a conductive probe element including a head having at least two different cross sectional dimensions along a length of the head, and a lower flange configured to be coupled to the vessel. The lower flange is formed to include a central aperture extending between a top surface and a bottom surface of the lower flange for receiving the probe element. The central aperture of the lower flange has at least two different cross sectional dimensions between the top and bottom surfaces of the lower flange to minimize impedance changes in the probe element adjacent the lower flange. The apparatus also includes an upper flange configured to be coupled to the lower flange to secure the probe element to the lower flange. The upper flange include a central aperture extending between a top surface and a bottom surface of the upper flange for receiving a top end of the probe element. The central aperture of the upper flange has at least two different cross sectional dimensions between the top and bottom surfaces of the upper flange to minimize impedance changes in the probe element adjacent the upper flange. The apparatus further includes a launch plate coupled to the upper flange, and an electrical connector coupled to the probe element. The connector is configured to couple the signal line to the probe element.

In one illustrated embodiment, the central aperture of the lower flange is defined by a radially outwardly tapered surface located adjacent a top surface of the lower flange, and the probe element includes a head having first and second radially outwardly tapered surfaces and an elongated conductive portion extending away from the head. The first tapered surface of the head being configured to engage the tapered surface of the lower flange to prevent movement of the probe element in a direction toward the lower flange. The central aperture of the upper flange is defined by a radially outwardly tapered surface located adjacent a bottom surface of the upper flange. The tapered surface of the upper flange is configured to engage the second tapered surface of the probe element to prevent movement of the probe element in a direction toward the upper flange.

In another illustrated embodiment, the central aperture of the lower flange is formed to include a radially expanded cavity adjacent said top surface, and the central aperture of the upper flange is formed to include a radially expanded cavity adjacent said bottom surface. If desired, a separate lower insert may be positioned within the cavity of the lower flange, and a separate upper insert may be positioned within the cavity of the upper flange. The upper and lower inserts are configured to engage the head of the probe element.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
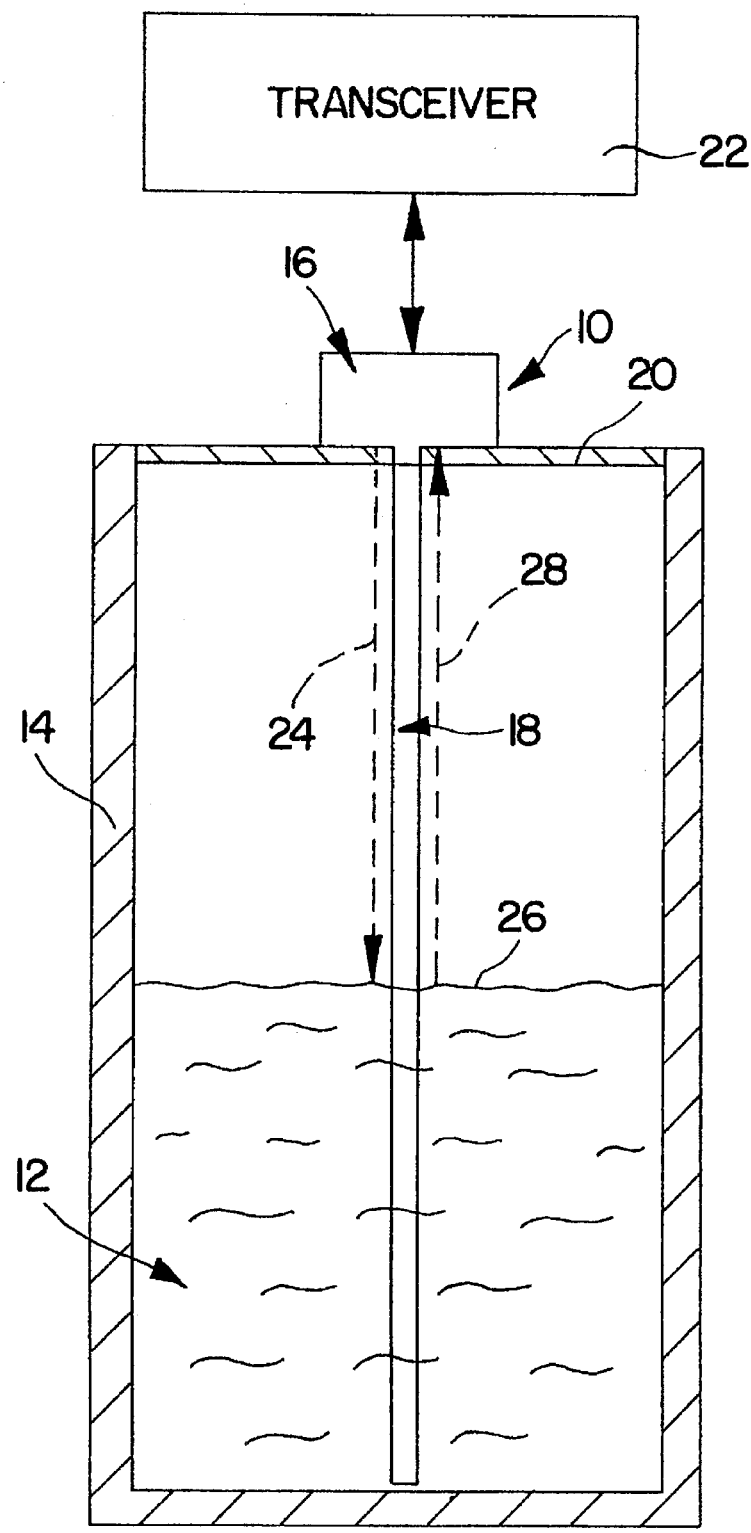
FIG. 1 is a diagrammatical view illustrating a single conductor material level sensor for measuring the level of a process variable such as a liquid in a vessel.

Referring now to the drawings, FIG. 1 is a diagrammatical illustration of operation of the surface wave transmission line sensor apparatus for process measurement. The apparatus 10 is adapted for use with level measurement of a process variable such as a liquid 12 store within a storage vessel 14.

The present invention includes a mechanical mounting apparatus 16 for securing a single conductor transmission line 18 to a top surface 20 of the vessel 14. (See vessel flange 34 in FIG. 2.) The mechanical mounting structure 16 also provides a sealing feature as discussed in detail below. The mechanical mounting apparatus 16 enables a transceiver 22 to transmit pulses down the single conductor 18 in the direction of arrow 24. Once the pulses reach a top surface 26 of liquid 12, a reflective pulse 28 is returned back up the conductor 18 in the direction of arrow 28.

The transceiver 22 includes processing circuitry which detects the reflected pulses to interpret the return pulses and to generate an output signal indicating the level of liquid 12 in the vessel 14. Preferably, the transceiver 22 transmits broadband pulses at a very low power level, such as about 1 nW or less average power, or 1 µW or less peak power. The frequency of the pulses is preferably about 100 MHz or greater.

The present invention is concerned with the mechanical mouting apparatus 16. The improved surface wave transmission line sensor apparatus of the present invention provides several functions for the process level measurement. The first function is a mounting function for securing the sensor apparatus to the vessel, pipe, chute, bin, or other process environment. A second function of the sensor apparatus of the present invention is to provide a seal between an interior region of the vessel and the environment. Yet another function of the sensor apparatus of the present invention is to provide a functional broadband transmission line which permits broadband, low power pulses to be transmitted down a single conductor transmission line.

Figure 2:
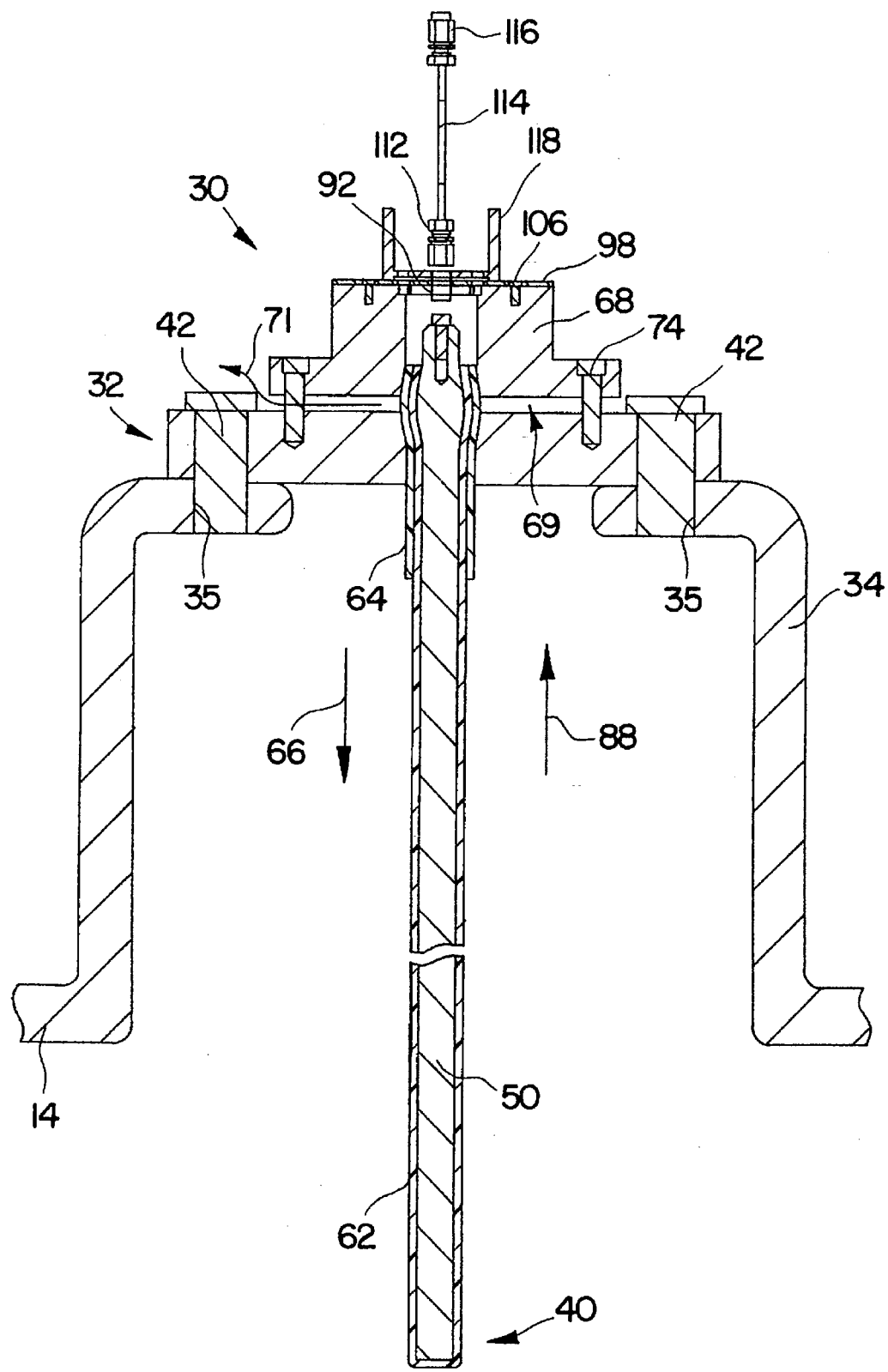
FIG. 2 is a sectional view illustrating a first illustrated embodiment of the present invention mounted on a tank flange of a vessel.
Figure 3:
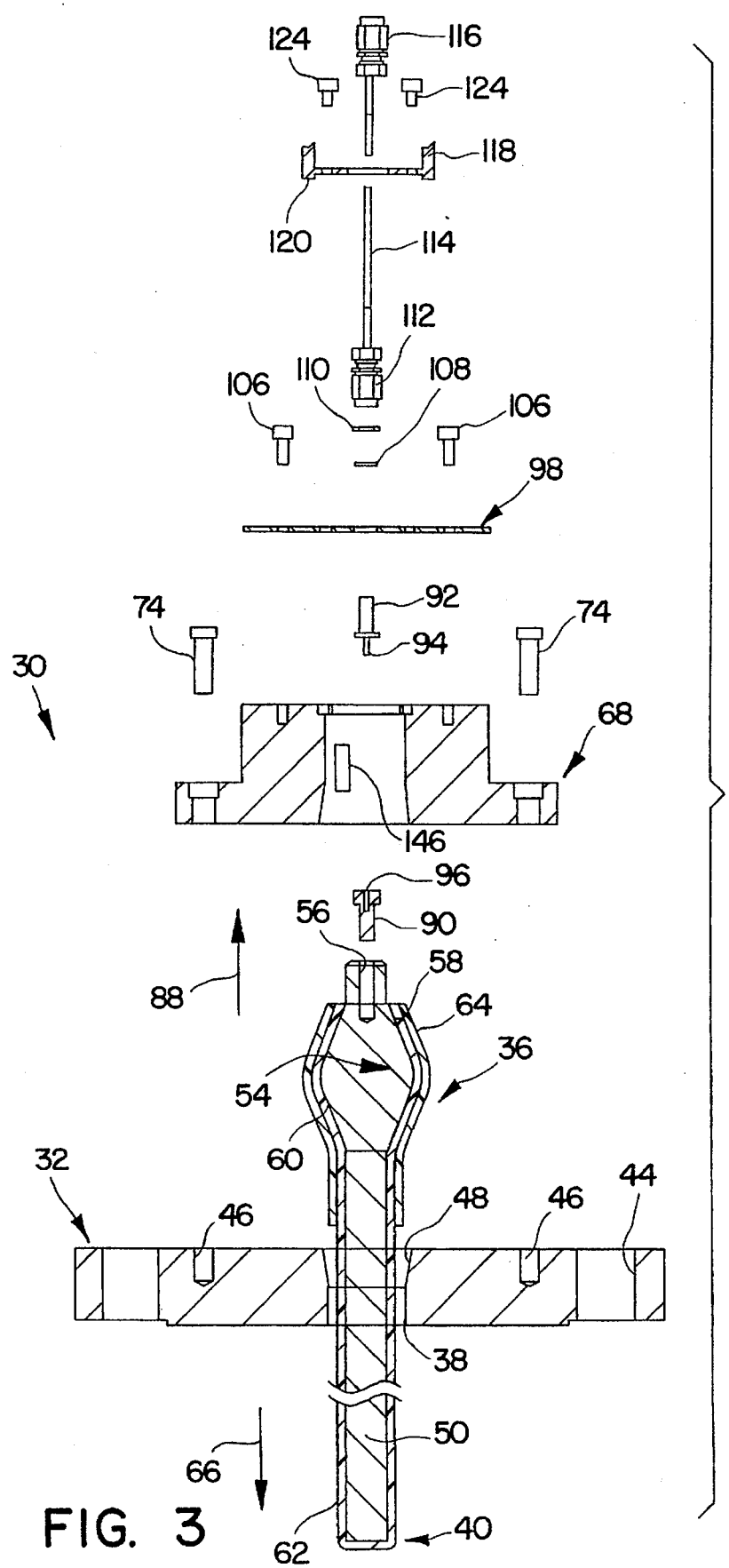
FIG. 3 is an exploded sectional view of the apparatus of FIG. 2.

Details of the apparatus of the present invention are illustrated in FIGS. 2 and 3. The entire mechanical assembly is referred to as sensor 30. Sensor 30 includes a process connection or lower flange 32 for securing the sensor 30 to amounting flange 34 on the vessel 14. Sensor 30 also includes a probe element 36 which is inserted through an aperture 38 formed in lower flange 32 so that a distal portion 40 of the probe 36 extends into the vessel 14 to provide a single conductor. Lower flange 32 is coupled to the flange 34 of the vessel by suitable fasteners 42 which extend through apertures 44 formed in lower flange 32 and apertures 35 formed in flange 34. It is understood that the lower flange 32 can have a reduced diameter with a threaded outer portion to provide a threaded connection to the vessel flange 34, if desired.

Figure 4:
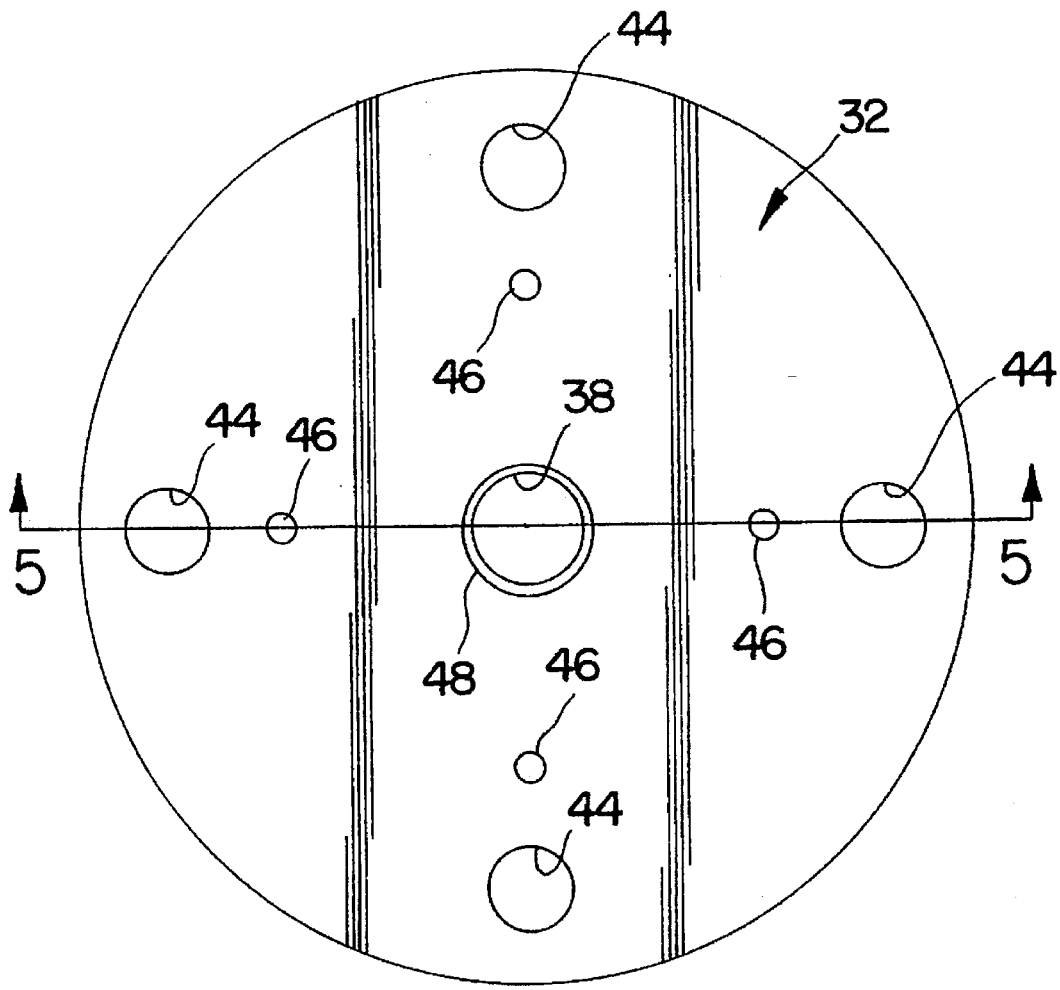
FIG. 4 is a top plan view of a lower process connection flange for connecting the sensor apparatus of the present invention to the tank flange.
Figure 5:
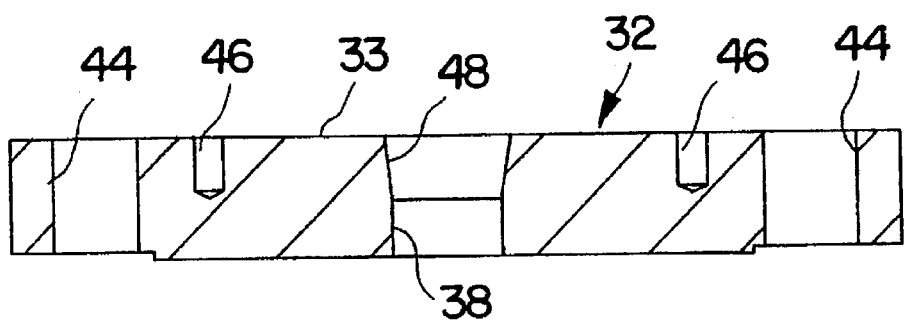
FIG. 5 is a sectional view taken along lines 5—5 of FIG. 4.

Lower flange 32 is best illustrated in FIGS. 4 and 5. Lower flange 32 includes four spaced apart threaded apertures 46. A central aperture 38 for receiving the probe element 36 is formed to include an outwardly tapered upper surface 48 to improve sealing of and to provide a smooth impedance transition of the probe element 36 as discussed in detail below. Tapered surface 48 is convergent in a direction extending downwardly from the top surface 33 of lower flange 32. Preferably, flange 32 is made from stainless steel or other metal material. It is understood that flange 32 may be made from another corrosive resistant nonconductive material in accordance with the present invention.

Figure 6:
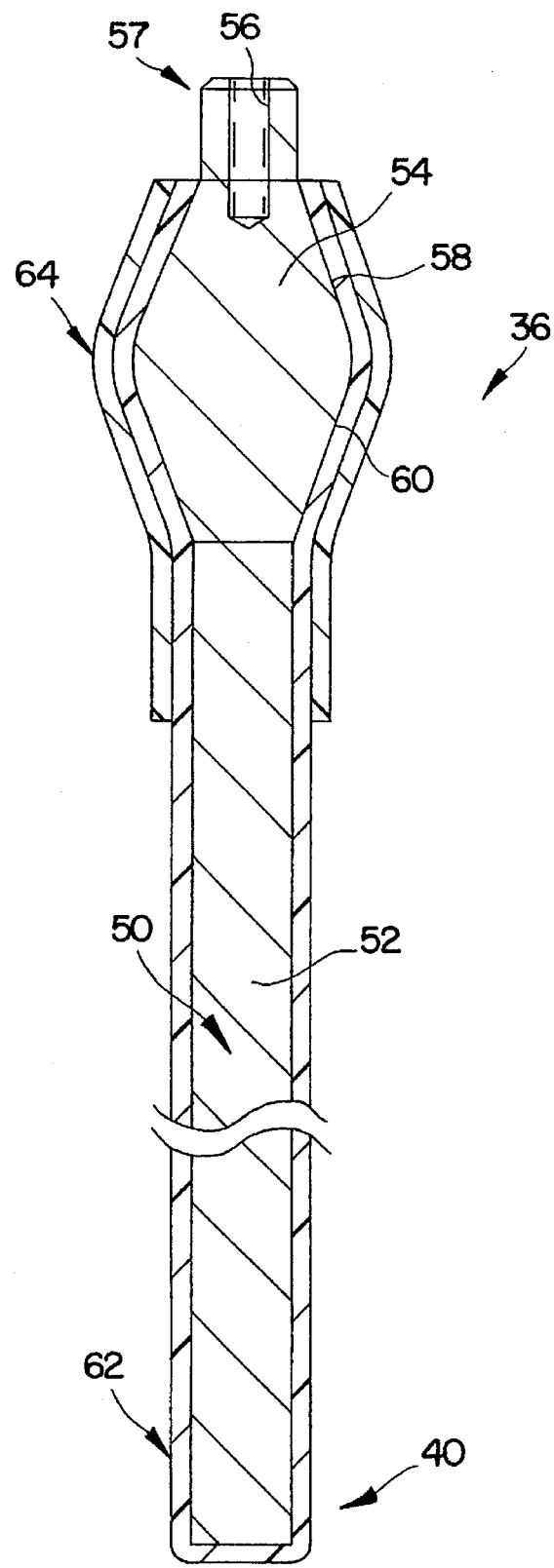
FIG. 6 is a sectional view of a single conductor probe element.

Probe element 36 is best illustrated in FIG. 6. The probe element 36 includes a single inner conductor 50 made from stainless steel or another metal material having an elongated, generally cylindrical body portion 52 and a head portion 54 having an increased diameter. Head portion 54 includes a threaded aperture 56 and outwardly tapered surfaces 58 and 60. Tapered surface 58 is a divergent conical surface extending in a direction downwarly from top end 57 of probe. Tapered surface 60 is a convergent conical surface extending in a direction downwardly form tapered surface 58.

Preferably, the entire conductor 50 is coated with at least one layer of Teflon 62 or other insulative material. In the illustrated embodiment, a second layer of Teflon 64 is added near the head portion 54 of conductor 50. It is understood that this area of increased thickness 64 may be excluded or that the Teflon coating may be single layer having an increased thickness adjacent head portion 54, or may be an alternate material.

The probe element 36 is inserted downwardly through aperture 38 formed in lower flange 32 so that the lower tapered surface 60 of head 54 engages the tapered portion 48 of aperture 38. Cooperation of tapered surface 48 of lower flange 32 with tapered surface 60 of probe element 36 provides increased retention force for the probe element 36 to prevent probe element 36 from being forced into the vessel 14 in the direction of arrow 66 by either external pressure outside the vessel 14 or a vacuum inside the vessel 14. Tapered surfaces 48 and 60 also provide a seal between the probe 36 and the lower flange 32.

The probe element 36 of the present invention functions as the conductor for a single line surface wave transmission line. The illustrated probe element 36 is constructed of a metal rod 50 as discussed above. In other embodiments, the probe element 36 may be constructed from a cable, wire, wire rope, or any other conductive linear element whether flexible or rigid. The probe element 36 can have a round or other cross-sectional shape, and can be coated (sheathed) or uncoated. In the present invention, such a probe element would include a head similar to head 54 with the conductive cable or other conductor extending downwardly from the head. The distal end 62 of probe element 36 is important in providing information related to system calibration, and compensation factors. In addition, the termination of distal end 62 can affect how well the sensor functions relative to process materials which contact the sensor in the direct area where the termination exists. The present design allows for various terminations while preserving the sensor function. For example, a ballast weight may be provided on cable type probes. Special ballast design or rod tip constructions can be improve information from the probe tip. The termination techniques also include the possibility of coupling the distal end of probe element 36 to the vessel 14.

Figure 7:
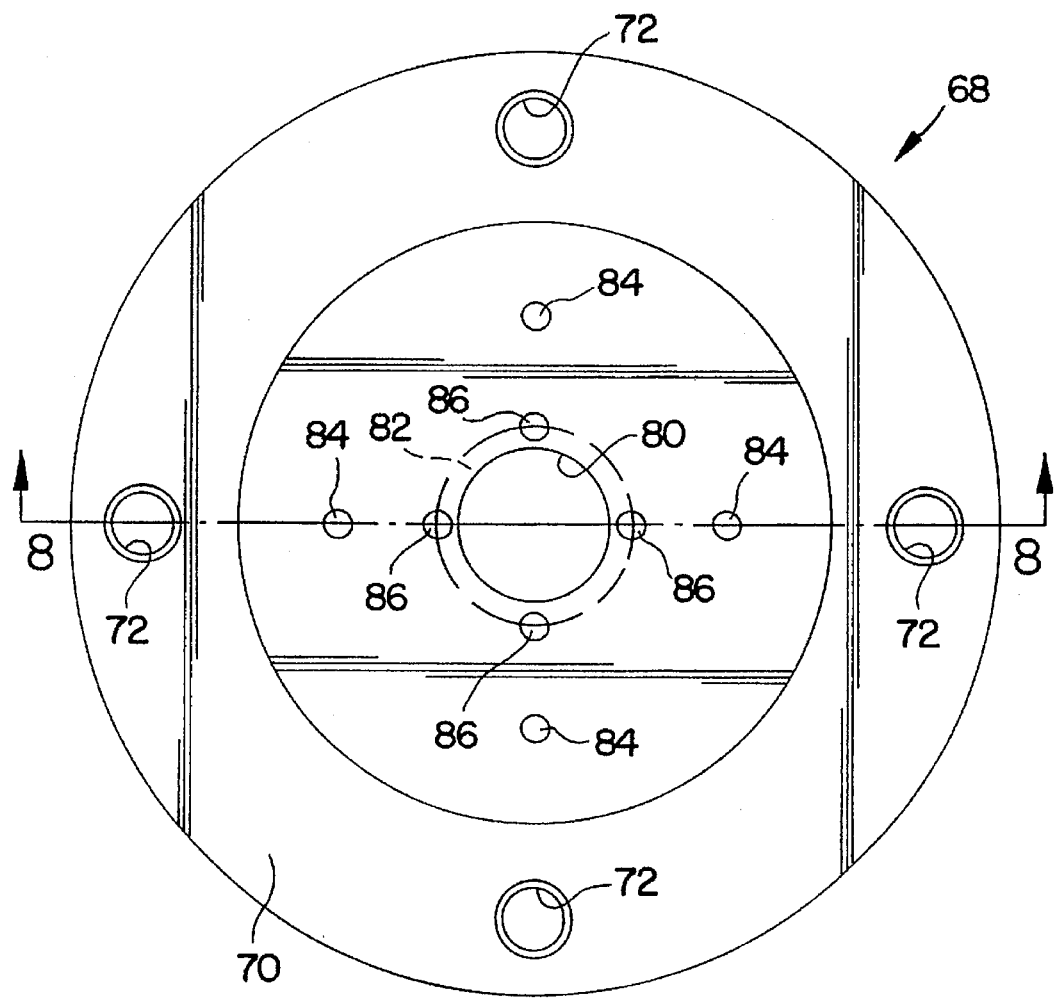
FIG. 7 is a top plan view of an upper mounting flange or standoff of the present invention.
Figure 8:
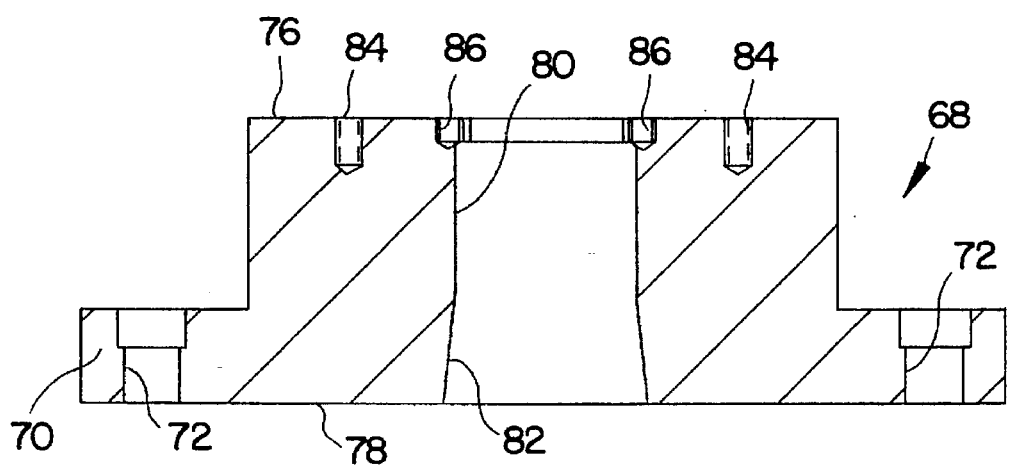
FIG. 8 is a sectional view taken along lines 8—8 of FIG. 7.

Referring again to FIGS. 2 and 3, an upper flange 68 is positioned over probe element 36 to secure the probe element 36 to the lower flange 32. Details of the upper flange 68 are illustrated in FIGS. 7 and 8. Upper flange 68 includes a mounting portion 70 formed to include apertures 72. Stainless steel screws 74 extend through apertures 72 and are threaded into threaded apertures 46 of lower flange 32 to secure the Upper flange 68 to the lower flange 32. Upper flange 68 includes a top surface 76 and a bottom surface 78. A central aperture 80 extends between the top surface 76 and bottom surface 78 of upper flange 68. Aperture 80 includes an outwardly expanded, tapered surface 82 located adjacent bottom surface 78. Tapered surface 82 is convergent in a direction extending upwardly from bottom surface 78. A first set of threaded apertures 84 is formed in top surface 76 of upper flange 68. A second set of threaded apertures 86 is also formed in top surface 76 of upper flange 68. The apertures 86 are spaced radially inwardly from the first set of apertures 84.

The tapered surface 82 of upper flange 68 engages the probe element 36 adjacent the tapered surface 58 of head 54. Cooperation of these tapered surfaces 82 and 58 prevent movement of the probe element 36 in the direction of arrow 88 due to high pressure inside the vessel 14 and to provide a seal between the probe 36 and the upper flange. Preferably, upper flange 68 is made from stainless steel or other metal material. It is understood that flange 68 may also be made from another corrosive resistant, nonconductive material in accordance with the present invention.

The upper and lower flanges 32 and 68 cooperate to rigidly fix or secure the probe element 36 to the process connection such as flange 34 of vessel 14. Probe element 36 is secured to vessel 14 with sufficient mechanical strength to withstand high temperature, high humidity, and high pressure. Cooperation of tapered surface 48 on lower flange 32 with tapered surface 60 on probe element 36 and cooperation of tapered surface 82 of upper flange 68 with tapered surface 58 of probe element 36 prevent outward movement of the probe element 36 relative to the upper and lower flanges 68 and 32 which might otherwise be caused by positive process pressures. The cooperation of the tapered surfaces also prevents inward or downward movement of the probe element 36 which might otherwise be caused by negative process pressure, gravity, or process forces such as viscosity, friction, turbulence, mechanical contact with agitators, etc.

The configuration of lower flange 32, probe element 36, and upper flange 68 also provide a process seal to minimize or prevent leakage of process materials such as gas, liquid, or particulate matter out of the containment vessel 14. The improved sealing arrangement of sensor apparatus 30 also prevents or minimizes the ingress of outside elements when the vessel is at low pressure. Such sealing is accomplished by sealing materials which fill spaces or gaps between electrical and mechanical elements tightly. For instance, by coating the probe element 36 with Teflon layers 62 and 64, an improved seal is obtained between the probe element 36 and upper and lower flanges 68 and 32.

The sensor apparatus 30 provides long term integrity of the seals under a wide range of temperature, pressure, and chemical exposure. Such sealing is also directed at non-pressurized vessels, where a pressure vector may be created by atmospheric conditions, conditions of fluid heat head pressure due to submersion of the mounting, or from process failures such as failed venting. The sealing surfaces are created between the metallic surfaces of the lower and upper flanges 32 and 68 and the metallic surfaces of the probe element 36 by using inert plastics, elastomers, or other dielectric materials such as the Teflon coatings 62 and 64 which are suitable for the pressures, temperatures, and chemicals encountered.

Referring again to FIGS. 2 and 3, a stainless steel screw 90 is threaded into threaded aperture 56 of probe element 36. A high frequency electrical connector 92 having a center conductor 94 is coupled to an opening 96 formed in the threaded screw 90 for receiving conductor 94. For example, high frequency connector 92 is an SMA connector.

Figure 9:
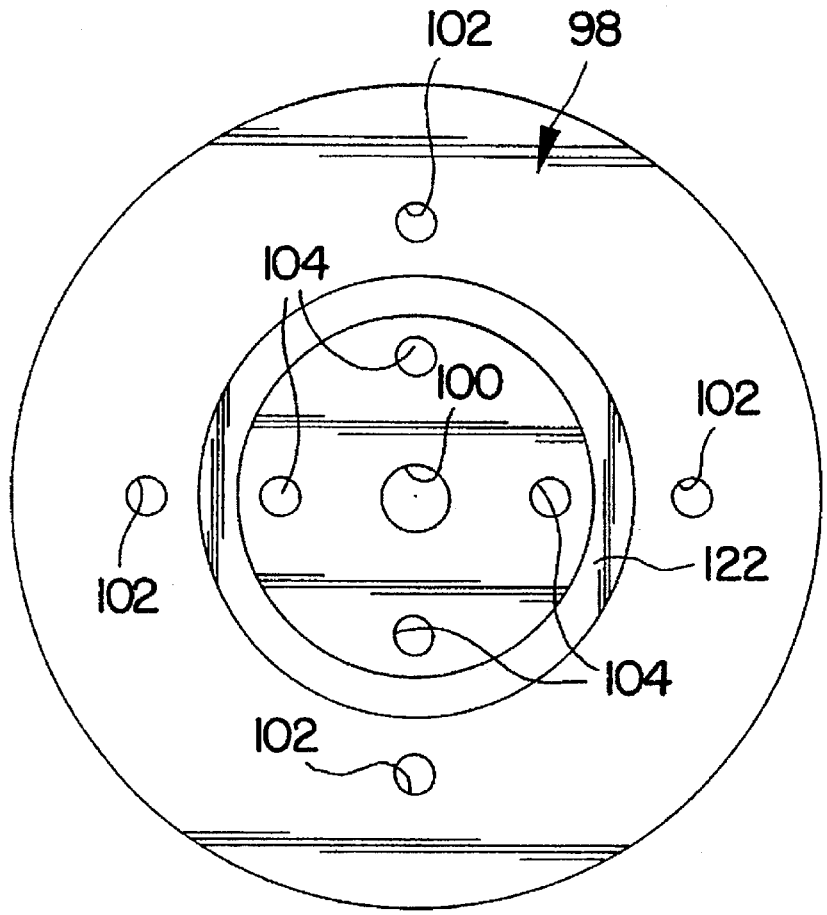
FIG. 9 is a top plan view of a launch plate of the present invention.

A stainless steel launch plate 98 includes a central aperture 100 which is positioned over high frequency connector 92. The configuration of launch plate 98 is best illustrated in FIG. 9. Launch plate 98 includes an outer set of apertures 102 and an inner set of apertures 104. Outer apertures 102 are aligned with apertures 84 formed in upper flange 68. Therefore, launch plate 98 is secured by top surface 76 of upper flange 68 by suitable fastener 106. A washer 108 and nut 110 are used to secure a central portion of launch plate 98 to the high frequency connector 92.

In another embodiment of the present invention, the upper flange 68 may be formed from a plastic or other nonconductive material. In this instance, the launch plate 98 is still made from metal. However, the launch plate 98 may be coupled to the top surface 76 or the bottom surface 78 of upper flange 68. In addition, the launch plate 98 may be imbedded within the upper flange 68 in this embodiment.

High frequency connector 92 is then coupled to the transceiver and processing electronics by, for example, a first SMA connector 112 which is coupled to high frequency connector 92. A coaxial cable 114 is coupled to connector 112 and to a second SMA connector 116 which is coupled to a processing circuit (not shown) located within an electrical housing 118. Illustratively, electrical housing 118 includes a bottom lip 120 which fits within a groove 122 formed in launch plate 98. Housing 118 is secured to the sensor apparatus 30 by fasteners 124 which extend through apertures of the electrical housing 118, through apertures 104 of launch plate 98, and into threaded apertures 84 in upper flange 68.

The sensor apparatus 30 provides a functional broad band transmission line. A center conductor of the coax cable 114 is coupled to probe element 36 through central conductor 94 of high frequency connector 92. The outer shield conductor of coax cable 114 is electrically coupled to launch plate 98 and upper flange 68. The configuration of lower flange 32, probe element 36, upper flange 68, and launch plate 98 provide a controlled impedance transition from the micro strip transmission line or coax cable 114 to the sensor apparatus 30. These elements provide a transition from a two-wire transmission line to a single wire or conductor transmission line such as probe element 36 while maintaining the mechanical requirements for fixing and sealing the sensor apparatus 30.

The transmission line of the present invention functions like a Goubau launching mechanism. However, the present launching mechanism is different from the classic Goubau cone. The sensor apparatus 30 provides complex topologies, as well as material selections, to provide an apparatus which can simultaneously mount and seal the sensor while providing a launching mechanism for the pulses.

A controlled impedance transition between the line 114 and the sensor 30 provides an initial reflection to provide a reference return pulse to the system electronics. The sensor 30 creates an inherent complex impedance mismatch as a transition from the cable 114 to the sensor 30. This impedance mismatch eliminates the need for a "zero time" detection at the initiating of the pulse itself by creating a reference pulse which occurs, in time, significantly later than the initiating pulse. As the signal leaves the 50 ohm cable 114, the impedance changes as the signal enters the sensor apparatus 30. The present invention does not require the use of a resistor or other impedance network to provide the reference reflective signal.

The present invention provides a smooth impedance transition after the initial change so that the pulse continues down the probe element 36. Tapered surface 82 of upper flange 68 and tapered surface 58 of probe element 36 provide a smooth impedance transition. In addition, tapered surface 60 of probe element 36 and tapered surface 48 of lower flange 32 also provide a smooth impedance transition to reduce the effect of such impedances on the transmitted signal. Therefore, the configuration of the sensor apparatus 30 provides spacial distribution control so that no abrupt changes in impedance are encountered by the signal. Abrupt diameter changes of the components are minimized in the upper and lower flanges 68 and 32 or the probe element 36 to minimize impedance changes.

Figure 10:
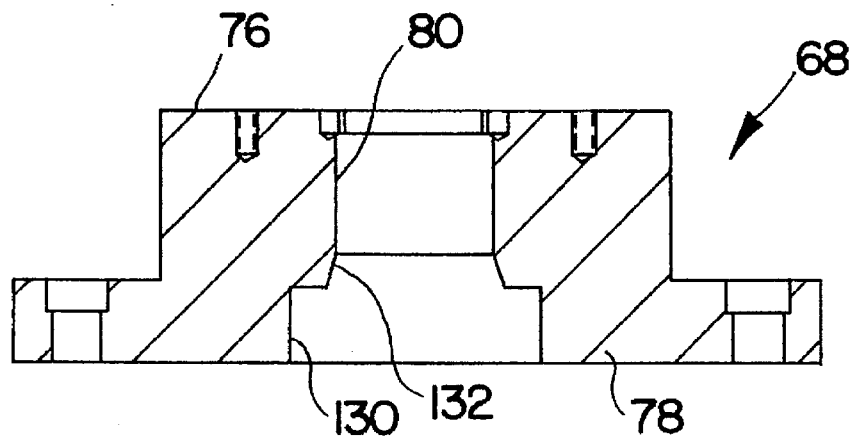
FIG. 10 is a sectional view taken through an alternative embodiment of the upper mounting flange of the present invention.
Figure 11:
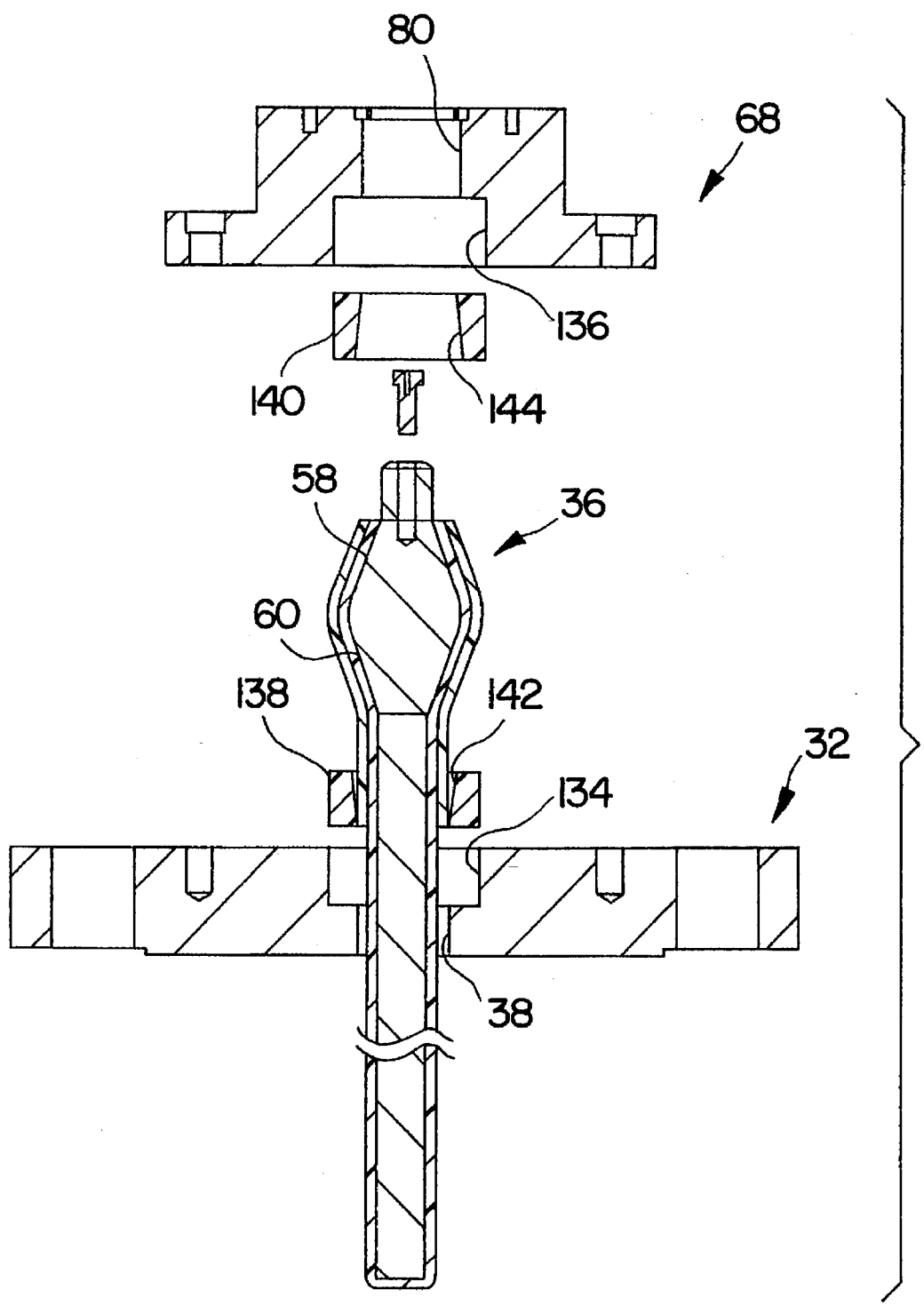
FIG. 11 is an exploded sectional view of another illustrated embodiment of the present invention in which the upper and lower mounting flanges have been modified.

Therefore, the present invention optimizes sensor impedances not just at the transition between the cable 114 and the sensor 30, but all the way through the sensor 30. Impedances through the sensor apparatus 30 are controlled by specific geometries. Such optimization is important with low power high frequency pulse signals to ensure maximum energy transferred to the probe element 36 by controlling or minimizing undesired reflections of pulsed energy. The sensor 30 incorporates mechanical features which optimize the total impedance of the sensor to a degree without which the transmission of energy would be severely limited. These features include, but are not limited to, spacings, material selection, shape, gas filled interstices. Such interstices, which are the size and shape of spacings between the parts, is a critical element. When signals from the process are very good, a version of the sensor apparatus illustrated in FIGS. 2–9 is sufficient. For improved performance, however, cavities or interstices are created in the flanges 32 and 68 as illustrated in FIGS. 10 and 11. These cavities further lower the impedance through the mounting.

The transmitted pulse and the reflected pulse characteristics are controlled via the impedances determined by the geometries of the launch plate 98, upper flange 68, lower flange 32 and probe element 36. Such characteristics include, but are not limited to, pulse width, amplitude, rise time, fall time, and polarity. Sensor apparatus 30 also minimizes, controls, or eliminates unwanted pulse reflections via impedances determined by these geometries.

As illustrated in FIG. 10, the upper flange 68 may be formed to include an expanded cavity 130 adjacent bottom surface 78. A relatively short tapered surface 132 provides a transition between aperture 80 and expanded cavity 130. In the FIG. 10 embodiment, tapered surface 132 is configured to engage tapered surface 58 of probe element 36. It is understood that lower flange 36 may have a configuration similar to the expanded cavity of FIG. 10, if desired.

Another embodiment of the present invention is illustrated in FIG. 11. In this embodiment, lower flange 32 includes an expanded cavity 134 adjacent aperture 38. Upper flange 68 also includes an expanded cavity 136 formed adjacent aperture 80. In certain circumstances, sensor apparatus 30 can be used with the expanded cavities 134 and 136 formed in lower flange 32 and upper flange 68, respectively, without any other components. In other circumstances, the cavities 134 and 136 are filled with a nonconductive material inserts 138 and 140. Illustratively, the inserts are made from PVC, ceramic, or other nonconductive material. In the FIG. 11 embodiment, insert 138 includes a tapered aperture 142 configured to abut tapered surface 60 of probe element 36. Insert 140 includes a tapered aperture 144 configured to engage tapered surface 58 of probe element 36. Inserts 138 and 140 are typically used when high pressure is encountered to prevent movement of the probe element 36 and to provide a larger sealing surface area.

The configuration of sensor apparatus 30 permits the launch plate 98 and the entire sensor 30 to be positioned outside the vessel 14. The external launching mechanism is protected or shielded from vessel-external influences by the complex topology of the sensor 30. The metallic construction of the upper flange 68 and lower flange 32 cooperate to minimize electromagnetic influences upon the launching function of the launch plate 98.

The sensor 30 also permits the addition of a resistive component or complex impedance network to shunt a static charge away from the system circuitry to ground. This is provided by coupling a resistor or impedance network 146 between screw 90 and high frequency connector 92. The resistor or impedance network can be coupled to washer 108 and to another washer which is positioned beneath the head of screw 90. Resistor or impedance network 146 provides a discharge bleeder path to shunt static charge way from the system electronics.

The lower seal provided between tapered surface 48 of lower flange 32 and tapered surface 60 of probe element 36 which is covered by layers 62 and 64 provides a process seal to keep material from entering or exiting from vessel 14. If the lower seal should fail, upper seal provided by tapered surface 82 of upper flange 68 and the coated tapered surface 58 of probe element 36 prevents the escaping material from entering the electronics housing 118. As illustrated in FIG. 2, a space is provided between the bottom surface 78 of upper flange 68 and a top surface 33 of lower flange 32. This space permits any leakage which passes through the lower seal to dissipate from the side of sensor apparatus 30. Therefore, this gap provides a visual indication of any leakage, and a cooling flamepath, pursuant to the National Electrical Code requirement (Article 501).

Although the invention has been described in detail with reference to a certain preferred embodiment, variations and modifications exist within the scope and spirit of the present invention as described and defined in the following claims.

What is claimed is:

1. A sensor apparatus for transmitting electrical pulses from a signal line into and out of a vessel to measure a process variable, the sensor apparatus comprising:

a lower flange configured to be coupled to the vessel, the lower flange being formed to include a central aperture defined by an outwardly tapered surface located adjacent a top surface of the lower flange;

a conductive probe element including a head having a first outwardly tapered surface, a second inwardly tapered surface, and an elongated conductive portion extending away from the head, the first tapered surface of the head being configured to engage the tapered surface of the lower flange to prevent movement of the probe element in a direction toward the lower flange;

an upper flange configured to be coupled to the lower flange to secure the probe element to the lower flange, the upper flange including a central aperture defined by an inwardly tapered surface located adjacent a bottom surface of the upper flange, the tapered surface of the upper flange being configured to engage the second tapered surface of the probe element to prevent movement of the probe element in a direction toward the upper flange; and an electrical connector coupled to the probe element, the connector being configured to couple the signal line to the probe element.

2. The apparatus of claim 1, further comprising a launch plate coupled to the upper flange.

3. The apparatus of claim 2, wherein the probe element, the upper and lower flanges, and the launch plate are made from a metal material.

4. The apparatus of claim 2, wherein the upper and lower flanges are made from a nonconductive material and the lunch plate is made from a metal material.

5. The apparatus of claim 2, wherein the signal line includes a signal conductor and a ground conductor, and wherein the electrical connector is configured to couple the signal conductor to the probe element and to couple the ground conductor to the launch plate.

6. The apparatus of claim 2, wherein the launch plate and the upper flange are configured to generate a reflective reference pulse on the signal line as the electrical pulses move from the signal line to the probe element.

7. The apparatus of claim 2, further comprising a static discharge resistor or network coupled between the probe element and the launch plate.

8. The apparatus of claim 1, wherein the probe element is covered with an insulative material.

9. The apparatus of claim 8, wherein the insulative material has an increased thickness adjacent the head of the probe element to improve sealing between the probe element and the upper and lower flanges.

10. The apparatus of claim 1, wherein the tapered surface of the lower flange converges in a direction extending downwardly from the top surface of the lower flange, and the tapered surface of the upper flange converges in a direction extending upwardly from the bottom surface of the upper flange.

11. The apparatus of claim 10, wherein the second tapered surface of the probe element is a divergent conical surface in a direction extending downwardly from a top end of the probe element, and the first tapered surface of the probe element is a convergent conical surface in a direction extending downwardly from the second tapered surface.

12. The apparatus of claim 1, wherein the top surface of the lower flange is spaced apart from the bottom surface of the upper flange to permit any material passing through the central aperture of the lower flange to escape between said top and bottom surfaces.

13. The apparatus of claim 12, wherein spaced apart the top surface of the lower flange and bottom surface of the upper flange are configured to provide a controlled flamepath.

14. The apparatus of claim 1, wherein the central aperture of the lower flange is formed to include a radially expanded cavity adjacent said top surface, and wherein the tapered surface of the lower flange is formed by a separate insert positioned within the cavity of the lower flange.

15. The apparatus of claim 14, wherein the insert is formed from a nonconductive material.

16. The apparatus of claim 1, wherein the central aperture of the upper flange is formed to include a radially expanded cavity adjacent said bottom surface, and wherein the tapered surface of the upper flange is formed by a separate insert positioned within the cavity of the upper flange.

17. The apparatus of claim 16, wherein the insert is formed from a nonconductive material.

18. A sensor apparatus for transmitting electrical pulses from a signal line into and out of a vessel to measure a process variable, the sensor apparatus comprising:

a lower flange configured to be coupled to the vessel, the lower flange being formed to include a central aperture extending between a top surface and a bottom surface of the lower flange;

a conductive probe element extending through the central aperture of the lower flange;

an upper flange configured to be coupled to the lower flange to secure the probe element to the lower flange, the upper flange including a central aperture extending between a top surface and a bottom surface of the upper flange for receiving a top end of the probe element;

a first seal for sealing the probe and the lower flange, the first seal is formed by an outwardly tapered surface located adjacent the top surface of the lower flange which engages a first outwardly tapered surface formed on the probe element;

a second seal for sealing the probe and the upper flange, the second seal is formed by an inwardly tapered surface located adjacent the bottom surface of the upper flange which engages a second, inwardly tapered surface of the probe element, the top surface of the lower flange being spaced apart from the bottom surface of the upper flange to permit any material passing through the first seal to escape therebetween; and an electrical connector coupled to the probe element, the connector being configured to couple the signal line to the probe element.

19. The apparatus of claim 18, further comprising a launch plate coupled to the upper flange, the connector being configured to couple a ground line to the launch plate.

20. The apparatus of claim 18, wherein the tapered surface of the lower flange converges in a direction extending downwardly from the top surface of the lower flange, and the tapered surface of the upper flange converges in a direction extending upwardly from the bottom surface of the upper flange.

21. The apparatus of claim 20, wherein the second tapered surface of the probe element is a divergent conical surface in a direction extending downwardly from a top end of the probe element, and the first tapered surface of the probe element is a convergent conical surface in a direction extending downwardly from the second tapered surface.

22. The apparatus of claim 18, wherein the central aperture of the lower flange is formed to include a radially expanded cavity adjacent said top surface, and the tapered surface of the lower flange is formed by a separate lower insert positioned within the cavity of the lower flange.

23. The apparatus of claim 22, wherein the central aperture of the upper flange formed to include a radially expanded cavity adjacent said bottom surface, and wherein the tapered surface of the upper flange is formed by a separate upper insert positioned within the cavity of the upper flange.

24. The apparatus of claim 23, wherein the upper and lower flanges are made from a conductive material and the upper and lower inserts are made from a nonconductive material.

25. A sensor apparatus for transmitting electrical pulses from a signal line into and out of a vessel to measure a process variable, the sensor apparatus comprising:

a conductive probe element including a head having at least two different cross sectional dimensions along a length of the head;

a lower flange configured to be coupled to the vessel, the lower flange being formed to include a central aperture extending between a top surface and a bottom surface of the lower flange for receiving the probe element, the central aperture of the lower flange having at least two different cross sectional dimensions between the top and bottom surfaces of the lower flange to minimize impedance changes in the probe element adjacent the lower flange;

an upper flange configured to be coupled to the lower flange to secure the probe element to the lower flange, the upper flange including a central aperture extending between a top surface and a bottom surface of the upper flange for receiving a top end of the probe element, the central aperture of the upper flange having at least two different cross sectional dimensions between the top and bottom surfaces of the upper flange to minimize impedance changes in the probe element adjacent the upper flange; and an electrical connector coupled to the probe element, the connector being configured to couple the signal line to the probe element.

26. The apparatus of claim 25, further comprising launch plate coupled to the upper flange, the connector being configured to couple a ground line to the launch plate.

27. The apparatus of claim 25, wherein the central aperture of the lower flange is defined by an outwardly tapered surface located adjacent a top surface of the lower flange, the probe element includes a head having a first outwardly tapered surface, a second inwardly tapered surface, and an elongated conductive portion extending away from the head, the first tapered surface of the head being configured to engage the tapered surface of the lower flange to prevent movement of the probe element in a direction toward the lower flange, and the central aperture of the upper flange is defined by an inwardly tapered surface located adjacent a bottom surface of the upper flange, the tapered surface of the upper flange being configured to engage the second tapered surface of the probe element to prevent movement of the probe element in a direction toward the upper flange.

28. The apparatus of claim 25, wherein the central aperture of the lower flange is formed to include a radially expanded cavity adjacent said top surface, and the central aperture of the upper flange is formed to include a radially expanded cavity adjacent said bottom surface.

29. The apparatus of claim 28, further comprising a separate lower insert positioned within the cavity of the lower flange, and a separate upper insert positioned within the cavity of the upper flange, the upper and lower inserts being configured to engage the head of the probe element.

30. The apparatus of claim 29, wherein the upper and lower flanges are made from a conductive material and the upper and lower inserts are made from a nonconductive material.

31. The apparatus of claim 28, further comprising a tapered transition section adjacent the radially expanded cavity of the lower flange, and a tapered transition section adjacent the radially expanded cavity of the upper flange.

* * * * *